July 30, 1946.  C. STOCKSTROM  2,404,933
AIRPORT
Filed Sept. 28, 1944  2 Sheets-Sheet 1
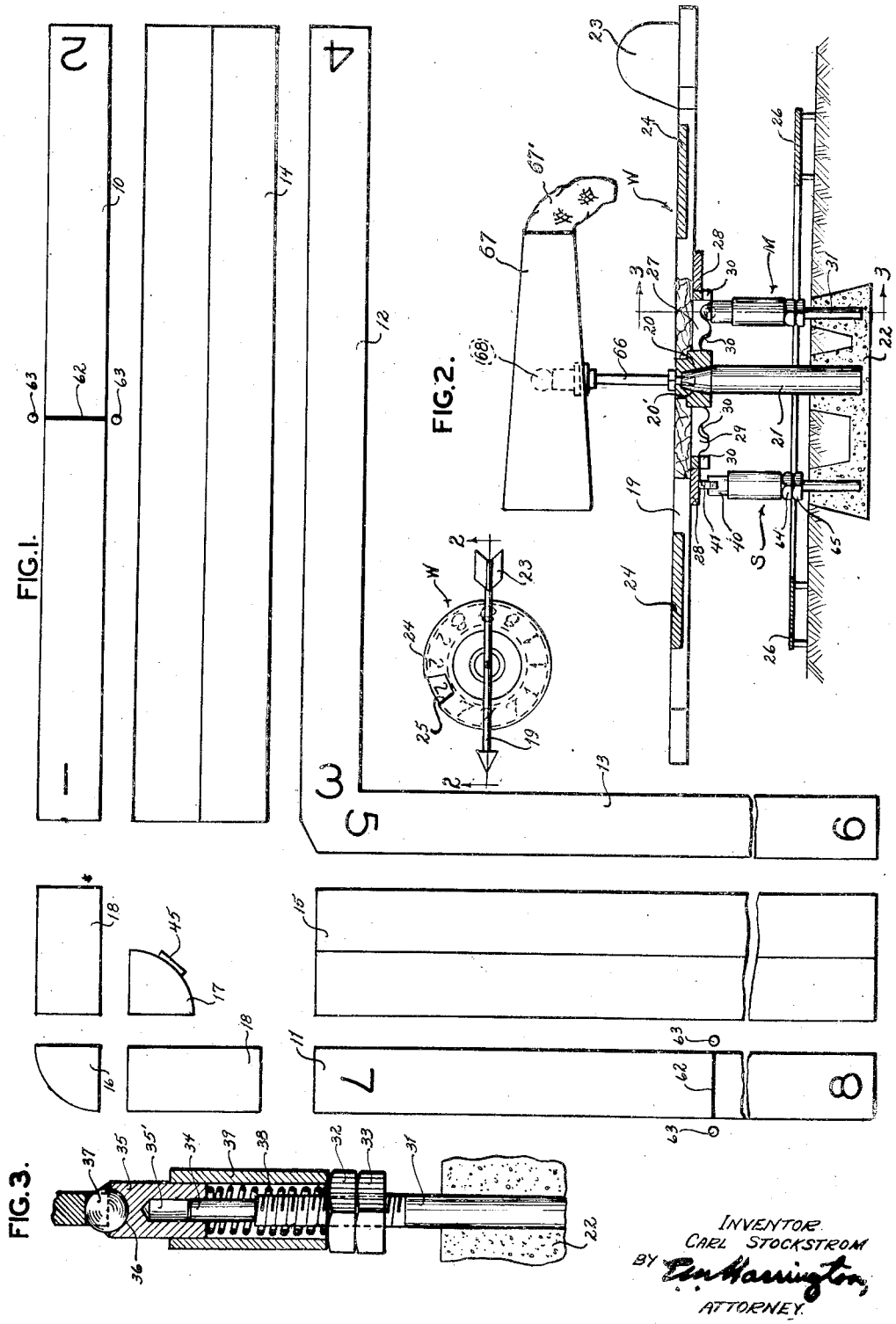
INVENTOR.
CARL STOCKSTROM
BY Tim Harrington
ATTORNEY

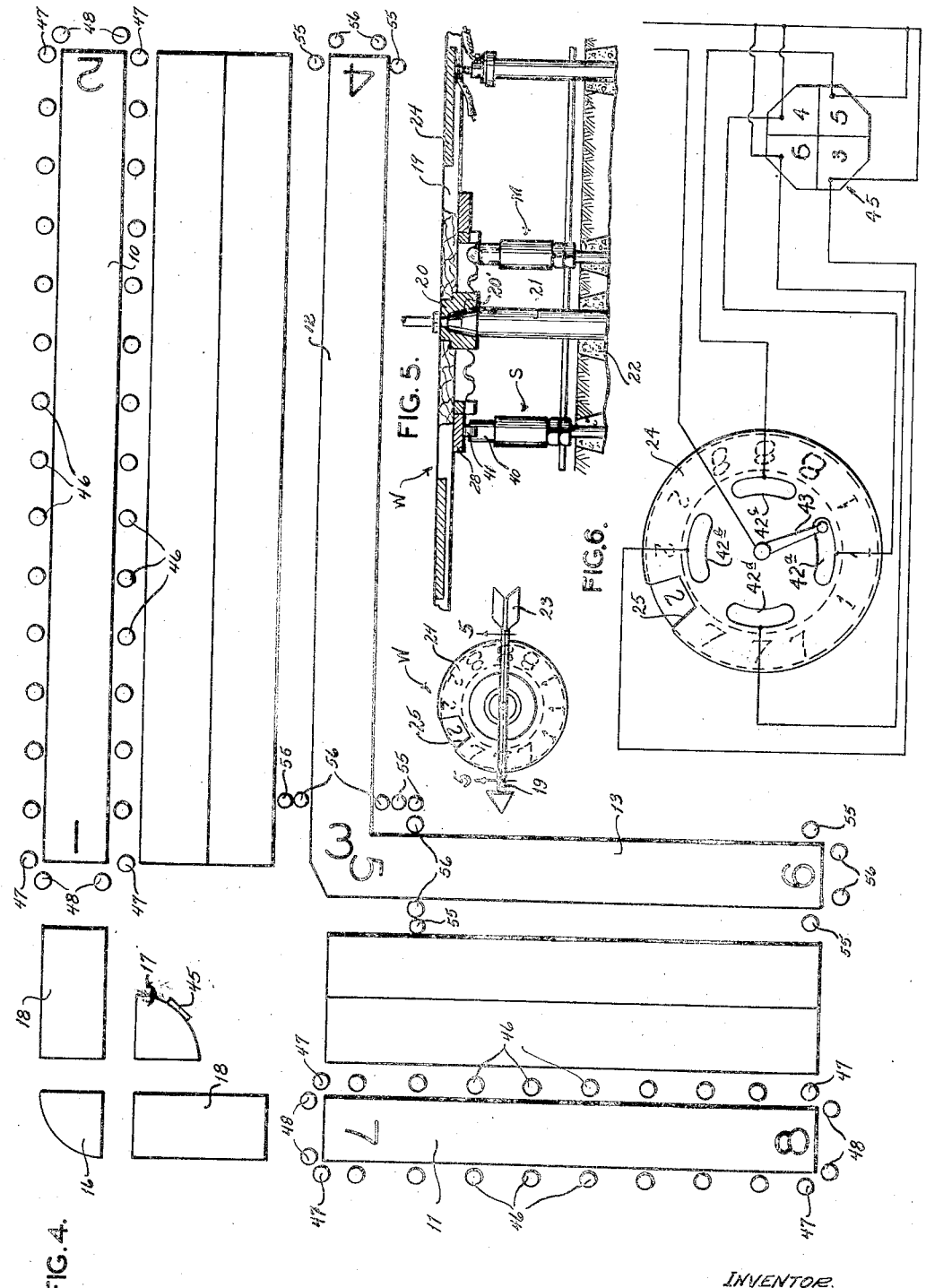

Patented July 30, 1946

2,404,933

UNITED STATES PATENT OFFICE 2,404,933

AIRPORT

Carl Stockstrom, Kimmswick, Mo.

Application September 28, 1944, Serial No. 556,267

5 Claims. (Cl. 177—352)

This invention relates generally to airports, and more specifically to airports of the type adapted for use in providing facilities for landing and taking-off of airplanes and other heavier-than-air aircraft, which require runways for such operations, the predominant object of the invention being to provide an airport of this type which is so constructed and arranged that the need for a manually operated control tower to give information to pilots of incoming and outgoing aircraft, as to wind-direction and direction of flight of aircraft making landings and taking-off, is eliminated.

Prior to this invention practically all airports of substantial size, included as parts of the facilities thereof control towers manned by members of the personnel of the airports whose duty it was to give to pilots of incoming and outgoing aircraft, by radio, or other means of communication, information as to wind and flight direction, and to designate runways which the pilots were to use for landings and take-offs. Naturally the maintenance in use of such control towers was a source of very considerable expense inasmuch as it was necessary that highly trained operators of the control towers be on duty at all hours of the day and night, and, also, there was always present a danger that incorrect information might be given to the pilots of aircraft by the human operators of the control towers, or that information correctly given might be misinterpreted by pilots.

The purpose of this invention, therefore, is to provide an airport which does not include a control tower, as such control towers have been constituted in the past, but which, instead, is provided with means operated automatically in response to changes in the direction of the wind to provide pilots of incoming and outgoing aircraft with all the information they need as to wind direction, and, also, to automatically designate what runways of the airport are to be used by pilots of incoming and outgoing aircraft for landings and take-offs.

Fig. 1 is a diagrammatical plan view of an airport constructed and arranged in accordance with this invention.

Fig. 2 is an enlarged vertical section taken on line 2—2 of Fig. 1.

Fig. 3 is an enlarged vertical section taken on line 3—3 of Fig. 2.

Fig. 4 is a view similar to Fig. 1, but illustrating the arrangement of the guiding lights of the runways employed when the airport is used at night.

Fig. 5 is an enlarged fragmentary vertical section taken on line 5—5 of Fig. 4.

Fig. 6 is a diagrammatical view illustrating the electrical wiring associated with the take-off indicator of the present invention.

In the drawings, wherein is shown for purposes of illustration, merely, one embodiment of the invention, 10 and 11 designate landing runways which extend at an approximate right angle with respect to each other. Also, 12 and 13 designate take-off runways which likewise are extended at an approximate right angle relative to one another, the take-off runway 12 paralleling the landing runway 10 in spaced relation with respect thereto, while the take-off runway 13 parallels the landing runway 11 and is spaced therefrom. Interposed between the landing runway 10 and the take-off runway 12, and arranged parallel therewith, is a taxi strip 14, and interposed between the landing runway 11 and the take-off runway 13, and arranged parallel therewith, is a similar taxi strip 15. The airport as illustrated in Figs. 1 and 4 includes certain buildings, these buildings being an administration building 16, a clearance building 17, and hangars 18.

The airport of the present invention includes a wind-indicator W which comprises a horizontally disposed member 19, that preferably is in the general shape of an arrow, and is provided at its approximate longitudinal center with a bearing 20. The bearing 20 is provided with a recess 20' which is shaped to receive the tapered upper end portion of a column 21 that supports the member 19 for horizontal, rotary movement relative to the column 21, the lower portion of said column 21 being embedded in a concrete base 22 which is arranged in the ground. The member 19, at its tail end is provided with an upstanding fin 23 of ample proportions, and said member 19 includes, also, a curved element 24 which is generally of circular form, a segmental portion of said element 24 being absent to provide a space 25 therein which performs a function to be hereinafter pointed out.

Suitably anchored in the ground is an annular member 26 which is disposed horizontally immediately above the surface of the ground and in vertical alinement with the curved element 24, as is shown to good advantage in Fig. 2. The annular member 26 has painted, or otherwise displayed on its top face, a series of spaced numerals, or other designating characters, the characters shown in the drawings being three numerals "1," three numerals "2," three numerals "7," and three numerals "8" (see Fig. 1). The space 25 of the element 24 of the member 19 is of such proportions that only one of the numerals of the annular member 26 is uncovered at a time so that it may be seen from the air through said space 25 of said element 24, all of the other numerals of said annular member 26 being covered by the continuous portion of said element 24 so that they may not be seen from the air. Obviously, one of the numerals of the annular member 26 may be seen at all times from the air, and the displayed numeral will change in accordance with changes in the direction of the wind. In other words, as the direction of the wind shifts, the wind acting against the fin 23 of the member 19 will rotate said member 19, the space 25 of the element 24 rotating with said member 19 and coming to rest, when rotation of the member 19 stops, at a point where a numeral of the member 26, other than the one previously displayed, is displayed through said space.

It is not desirable that the member 19 of the wind-indicator W be shifted in response to every slight variation in the direction of the wind, and therefore the wind-indicator is provided with means which prevents such movement of said member 19. The means referred to comprises an annular structure 27 which is secured to the member 19 at the lower face thereof, said annular structure including an annular, outer portion 28, whose lower face is flat and is disposed horizontally. Located inwardly of the outer portion 28 of the structure 27 is an annular rim 29 in which a series of spaced notches 30 are formed, these notches being of substantial semicircular shape and opening downwardly, as is shown to good advantage in Fig. 2, and there being twelve of said notches, one for each of the numerals of the annular member 26.

Supported by the concrete base 22, wherein its lower portion is embedded, is a vertically disposed rod 31, which is screwthreaded throughout its upper portion, as is shown in Fig. 3, the upper screwthreaded portion of said rod 31 having mounted thereon a nut 32, with which is associated a lock nut 33. The rod 31 is a part of a means M and said rod 31 is provided with an upper extension 34 of reduced diameter which extends into a cavity 35' of a head 35, said head being provided with a socket 36 at its upper end in which a ball 37 is supported for rotary movement. Interposed between the lower end of the head 35 and the top face of the nut 32 is a coil spring 38, and supported by said nut 32 and embracing a portion of the rod 31 and the extension 34 thereof, the coil spring 38, and a lower portion of the head 35, is a tubular element 39. The ball 37 is adapted to be seated in one of the notches 30 of the annular structure 29 at a time, and such tension may be applied to the coil spring by manipulating the nut 32 as to cause the ball to resist turning movement of the member 19 of the wind-indicator W in response to variation in the direction of the wind at low velocity. However, when a change in the direction of the wind occurs and the wind is blowing at a velocity which is sufficient to overcome the holding effect of the coil spring 38, the member 19 will be subjected to rotation, the ball being depressed against the force of the coil spring 38 and snapping into the next notch, or into successive notches, depending on the extent of the shift in the direction of the wind. Obviously, various tensions may be applied to the coil spring 38 by manipulating the nut 32, and said nut 32 may be locked against accidental rotation by the lock nut 33.

In order to avoid any tendency for the coil spring 38, acting against the head 35, to tilt the member 19 with respect to the upper portion of the column 21 and thereby interfere with free rotation of said member 19, a structure S is provided which is disposed at the opposite side of the column 21 with respect to the means M. The structure S is constructed and arranged in accordance with the means M, with the exception that the head 40 thereof rotatably supports a roller 41, instead of a ball, and said roller contacts with the lower face of the outer portion 28 of the annular structure 27, as is shown in Fig. 2. The structure S includes a coil spring (not shown) which urges the head 40 upwardly, and tension of said coil spring may be regulated in accordance with the tension of the coil spring 38 of the means M by manipulating a nut 64 which has a lock nut 65 associated therewith.

By referring to Fig. 6 it will be noted that the curved element 24 of the member 19 has related thereto a series of stationary electrical contacts 42a, 42b, 42c, and 42d, there being one of such contacts for each group of like numerals of the annular member 26. Also, an electrical contact 43 is provided which is suitably supported on the member 19 for movement therewith so that the contact 43 will contact with said contacts 42a, 42b, 42c, and 42d, as the member 19 rotates. Suitable electrical wiring electrically connects the fixed contacts 42a, 42b, 42c, and 42d, and the movable contact 43 to a source of energy and to a take-off indicator 45, which take-off indicator in the drawings is illustrated as being mounted on a wall of the clearance building. The take-off runways are provided with numerals, or other suitable characters, at their opposite ends, the take-off runway 12 in the drawings having the numerals "3" and "4" displayed at its opposite ends, while the take-off runway 13 has displayed at its opposite ends the numerals "5" and "6," and the take-off indicator is provided with similar numerals which are adapted to be displayed when the appropriate electrical contacts have been made between the contact 43, which moves with the member 19, and the fixed contacts 42a, 42b, 42c, and 42d.

The landing runways 10 and 11 have displayed at their opposite ends large numerals, or other suitable characters, and these numerals may be readily seen by a pilot of an airplane high in the air over the airport. Assuming now, that a pilot over the airport desires to make a landing, the arrow-like member 19 of the wind-indicator W would advise him as to the direction of the wind, and, also, he would note that a large numeral is displayed at the location of the wind-indicator, this numeral being one of the numerals of the annular member 26 which is visible from the air through the space 25 of the element 24 of the wind-indicator. In Fig. 1 a numeral "2" is displayed at the wind-indicator W and this would advise the incoming pilot that he was to make his landing on landing runway 10, approaching same at the end thereof at which the numeral "2" is displayed, which would cause him to land his airplane against the direction of the wind. Likewise, if the direction of the wind were approximately opposite to that indicated by the wind-indicator W in Fig. 1, the numeral "1" of the annular member 26 of the wind indicator would be visible from the air and the pilot would land his airplane on the landing runway 10 by approaching same from the end thereof at which the numeral "1" is displayed. In like manner, if the wind were blowing at an approximate right angle to the direction indicated by the wind-indicator in Fig. 1, either the numeral "7" or the numeral "8" of the annular member 26 of the wind-indicator would be visible from the air, depending on the direction of the wind, and the pilot would land his airplane on the landing runway 13 approaching same from the end thereof which bears a numeral corresponding to the numeral displayed at the wind-indicator.

It is obvious, therefore, that the pilot of an incoming plane is given precise information as to the direction of the wind, and is advised as to the particular runway on which he is to land and the direction from which he is to approach the runway. Nor, can he mistake a take-off runway or a taxi strip for the landing runway on which he is to land, because the taxi strips are un-numbered, while the numerals designating the ends of the take-off runways are different from the numerals displayed at the ends of the landing runways and the numerals displayed at the wind-indicator.

When an airplane is to depart from the airport the pilot need only consult the take-off indicator 45 at the clearance building to be advised as to which take-off runway he is to use and the direction of his take-off from such runway. With the wind-indicator positioned as shown in Fig. 1, the take-off indicator would display the numeral "4" and a departing pilot would know that he was to use take-off runway 12, starting from the end thereof designated by the numeral "4." Likewise, if the wind were blowing in a direction other than that indicated by the wind-indicator in Fig. 1 one of the numerals "3," "5," or "6" would be displayed at the take-off indicator 45, depending on the direction of the wind, and this displayed numeral would advise the departing pilot as to the take-off runway to be used and the direction of his take-off on the designated runway.

The invention as thus far described is adapted for use in daylight when the various characters may be seen, but the invention also includes an arrangement for electrically lighting the landing runways of the airport which provides for the use thereof after dark. This lighting arrangement is illustrated in Fig. 4, wherein the landing runways 10 and 11 are shown as being provided with rows of spaced lights 46 of a distinctive color, amber, for instance, arranged parallel with and slightly outwardly of the opposite side edges thereof. Preferably, these lights 46 are arranged substantially flush with the surface of the ground so as not to interfere with movement of airplanes which may get off of the runways. At each end of each of the landing runways 10 and 11 a pair of green lights and a pair of red lights are arranged, the green lights being designated by the reference character 47, and the red lights being designated by the reference character 48, and said pairs of lights being arranged substantially flush with the surface of the ground.

The stationary electrical contacts 42a, 42b, 42c, and 42d, and the contact 43 supported by the member 19, which have been previously mentioned herein in connection with the operation of the take-off indicator 45, serve, also, as means for completing certain electrical circuits (not shown) leading from a source of electrical energy to the electric lights associated with the landing runways 10 and 11, and the take-off runways 12 and 13. As will be noted from Fig. 6, the stationary contacts 42a, 42b, 42c, and 42d, are of arcuate shape, and each thereof is of such length and so related to a group of like numerals of the annular member 26, that electrical contact is maintained between the movable contact 43 and one of the arcuate, stationary contacts even though the wind-indicator W is shifted, by changes in the direction of the wind, to cause one or the other of the numerals of a given group of numerals of the annular member 26 to be displayed through the space 25 of the curved element 24 of the wind-indicator. In other words, if, as is shown in Fig. 1, a numeral "2" of the group of numerals "2" is displayed through the space 25 of the curved element 24 of the wind-indicator, and the wind shifts slightly so as to cause one or the other of the numerals "2" of the group to be displayed through the space 25, the electrical circuit completed by the movable contact 43 and the effective stationary contact will remain completed during such slight shifting of the wind-indicator. However, if a shift in the direction of the wind occurs which is substantial, then the movable contact 43 will pass out of contact engagement with the stationary contact with which it had been in contact engagement so as to break the circuit previously energized, and said movable contact 43 will move into contact engagement with a different stationary contact to complete a different circuit.

The various contacts 42a, 42b, 42c, and 42d are connected electrically to different pairs of the green and red lights 47 and 48 of the landing runways; that is to say, the contact 42a is connected to the red lights 48 at the end "1" and the green lights 47 at the end "2" of the landing runway 10. In like manner, the contact 42b is electrically connected to the red lights 48 at the end "2" and the green lights 47 at the end "1" of the landing runway 10, the contact 42c is electrically connected to the green lights 47 at the end "7" and the red lights 48 at the end "8" of the landing runway 11, and the contact 42d is electrically connected to the green lights 47 at the end "8" and the red lights 48 at the end "7" of said landing runway 11. Also, the guide lights 46 at the opposite sides of the landing runways 10 and 11 are connected to the appropriate contacts 42a, 42b, 42c and 42d, so that when any combination of red and green lights of a particular landing runway is lighted, the side guide lights 46 of that particular landing runway will also be lighted.

In the night operation of the airport the wind-indicator W is, of course, in operation, and the member 19 of said wind-indicator rotates in response to changes in the direction of the wind, and as a result of such rotation of the member 19 of the wind-indicator various combinations of the green and red lights and the side guide lights associated with landing runways 10 and 11 will be lighted to indicate to the pilot of an incoming airplane what landing runway he is to use for his landing, and in what direction he is to approach such runway. In other words, a green light is universally recognized as a "safety" or "proceed" signal, while a red light is recognized as a "danger" or "stop" signal. Therefore, the pilot of an airplane making a landing on the airport at night need only select a landing runway which is lighted by green lights at one end and red lights at the opposite end, and by side guide lights, and approach the selected runway for the landing from the green-lighted end thereof and stop his airplane short of the red-lighted end of the runway, being sure, of course, to keep his airplane between the rows of amber lights 46 which mark the opposite side edges of the runway.

The take-off runways 12 and 13 of the airport also are provided with green lights 55 and red lights 56 at opposite ends thereof, as illustrated diagrammatically in Fig. 4, which aid the pilot of a departing airplane to take-off from the proper take-off runway at night and in the proper direction. The green and red lights of the take-off runways are connected by suitable electrical wiring to the stationary contacts 42a, 42b, 42c, and 42d, so that as the contact 43 moves with the member 19 of the wind-indicator W in response to changes in the direction of the wind different combinations of red and green lights will be lighted at the ends of the take-off runways 12 and 13. The signal green and red lights of the take-off runways 12 and 13 are operated just as are the green and red lights of the landing runways 10 and 11, as previously explained herein; that is to say, in any position of the member 19 of the wind-indicator W, the green lights at one end and the red lights at the opposite end of a take-off runway will be lighted. The departing pilot will know, therefore, that he is to start his take-off run at the green lighted end of the take-off runway, and that he is to have his airplane off of the runway before the opposite, red-lighted end thereof is reached.

In order to give pilots who may be strangers to the airport information as to the length of the runways, wide lines 62, of a color which contrasts with the runway, may be displayed across the landing runways, said lines being spaced a determined number of feet apart. At night, when the lines cannot be seen from the air, electric lights 63 of purple, or other distinctive color, will be displayed at opposite ends of the lines 62 so that an incoming pilot may be advised as to their locations.

If desired the column 21 of the wind-indicator W may be provided with an upstanding rod 66 which supports for horizontal rotary movement a wind sock 67. This wind sock is provided with a flexible end portion 67' which serves, by the elevation of its outer end portion, to indicate the approximate velocity of the wind, and also an electric light 68 is arranged within the wind sock for illumination at night. The wind sock is supported by the rod 66 for free horizontal rotary movement independently of the restrained horizontal movement of the member 19 of the wind-indicator W, and therefore any variance in the relative positions of the wind sock 67 and the member 19 will indicate to an incoming pilot that the direction of the wind varies slightly from the wind direction indicated by the member 19 of the wind-indicator, due to the fact that the velocity of the wind is not sufficient to shift said member 19 to a different position.

I claim:

1. An airport having a runway provided with characters which identify the opposite ends of said runway, and wind-actuated means operable to display a character corresponding with the character at one or the other end of said runway for guiding the direction of approach of an aircraft to said runway, said wind-actuated means including a member movable in response to changes in the direction of the wind for indicating the direction of the wind, and means for resisting movement of said member in response to variation in the direction of the wind which is less than a predetermined variation in the direction of the wind.

2. An airport having a runway provided with characters which identify the opposite ends of said runway, and wind-actuated means operable to display a character corresponding with the character at one or the other end of said runway for guiding the direction of approach of an aircraft to said runway, said wind-actuated means including a member movable in response to changes in the direction of the wind for indicating the direction of the wind, and spring-controlled means for resisting movement of said member in response to variation in the direction of the wind which is less than a predetermined variation in the direction of the wind.

3. An airport having a plurality of runways each provided with characters at the opposite ends thereof which identify said opposite ends of said runways, the characters at the opposite ends of each runway being different and the characters of the different runways being different, and wind-actuated means operable to display a character corresponding with the character at one or the opposite end of one or another of said runways for directing an incoming aircraft to a particular runway and for indicating the direction of approach of an aircraft to the designated runway.

4. An airport having a plurality of runways each provided with characters at the opposite ends thereof which identify said opposite ends of said runways, the characters at the opposite ends of each runway being different and the characters of the different runways being different, and wind-actuated means operable to display a character corresponding with the character at one or the opposite end of one or another of said runways for directing an incoming aircraft to a particular runway and for indicating the direction of approach of an aircraft to the designated runway, said wind-actuated means including a member movable in response to change in the direction of the wind for indicating the direction of the wind.

5. An airport having a plurality of runways each provided with characters at the opposite ends thereof which identify said opposite ends of said runways, the characters at the opposite ends of each runway being different and the characters of the different runways being different, and wind-actuated means operable to display a character corresponding with the character at one or the opposite end of one or another of said runways for directing an incoming aircraft to a particular runway and for indicating the direction of approach of an aircraft to the designated runway, said wind-actuated means including a member movable in response to change in the direction of the wind for indicating the direction of the wind, and means for resisting movement of said member in response to variation in the direction of the wind which is less than a predetermined variation in the direction of the wind.

CARL STOCKSTROM.